Patented Nov. 6, 1934

1,979,515

UNITED STATES PATENT OFFICE 1,979,515

MANUFACTURE OF ORGANIC ESTERS

William S. Wilson, Boston, Mass., assignor to Merrimac Chemical Company, Inc., Everett, Mass., a corporation of Massachusetts No Drawing. Application January 11, 1934, Serial No. 706,251

7 Claims. (Cl. 260—106)

This invention relates to the manufacture of alkyl esters of carboxylic acids and it has particular application to the manufacture of such esters wherein the acid is employed in the form of a metal salt, such as calcium acetate, and the alcohol is supplied as an ester of sulfuric acid.

It has been proposed heretofore to manufacture alkyl esters of carboxylic acids, such as the alkyl acetates, by reacting an alkyl hydrogen sulfate with calcium acetate while avoiding the use of substantial amounts of water whereby the esterification is said to be facilitated. While it is true that alkyl sulfates react with calcium acetate to form alkyl acetates and calcium sulfate, the yield is far from quantitative and under some conditions, as when the ethyl sulphate is largely of the dialkyl species, is negligible.

I have now found that it is practicable to produce esters, such as ethyl acetate from ethyl sulphates which may contain large quantities of diethyl sulphate, in practically quantitative yields and at a rate which is substantially equivalent to that obtained in present day processes wherein free ethyl alcohol is employed, if the reaction is effected in the presence of substantial amounts of water and under conditions whereby there is present at all times an excess of either free sulfuric acid or alkyl hydrogen sulfate. Thus, in the case of ethyl acetate which is obtained from diethyl sulphate and calcium acetate, I proceed by first hydrolyzing the diethyl sulphate to ethyl alcohol, sulfuric acid, and varying quantities of ethyl sulfuric acid, after which calcium acetate is added, care being exercised to avoid the conversion of all of the sulphate radical present to calcium sulphate or calcium ethyl sulphate.

Diethyl sulphate is obtained conveniently by causing ethylene to combine with concentrated sulfuric acid. Depending upon the conditions of the reaction, including the pressure of ethylene, the concentration of the sulfuric acid, as well as the temperature of the reacting mixture, one obtains an equilibrium mixture of diethyl sulfate, ethyl sulfuric acid and free sulfuric acid. A typical example of one such mixture contains 50%—55% or more of diethyl sulfate, 30%—40% ethyl sulfuric acid and the remainder free sulfuric acid. Such a mixture is perfectly stable and suffers no decomposition in storage. If acetic acid (in the form of calcium acetate) be added to this mixture in an amount which is the mol equivalent of the ethyl ($C_2H_5$) group present, little, if any, esterification results even after prolonged boiling and in the presence of an excess of water. I have found, however, that practically quantitative yields are obtainable if the original mixture, which is obtained by diluting the sulfated ethylene with water, is first hydrolyzed as by boiling, preferably under vigorously agitated conditions whereby the insoluble diethyl sulfate is converted to ethyl alcohol and ethyl sulfuric acid. Part of the ethyl sulfuric acid which is present will simultaneously be converted to free sulfuric acid and ethyl alcohol. After the decomposition of the diethyl sulfate is completed, which can readily be established by the fact that the mixture loses its cloudy appearance and becomes clear, one may add the desired amount of calcium acetate which is equivalent to approximately 80% of the ethyl radical that is present in the mixture. The addition of the calcium acetate results in the formation of calcium sulfate with the liberation of free acetic acid. However, there is present a quantity of free sulfuric or ethyl sulfuric acid. When this mixture is digested, ethyl acetate is formed and may be recovered from the mixture by distillation, after which the residual suspension of calcium sulfate is blown with steam to assure the complete removal of any free alcohol or acetic acid which may be present.

If one proceeds as above, omitting, however, the hydrolysis step by which the diethyl sulfate is converted to ethyl sulfuric acid and alcohol and part of the ethyl sulfuric acid is converted to free sulfuric acid and alcohol, the amount of ethyl acetate obtained would be negligible.

A specific embodiment of my invention is hereinafter set forth, it being understood that the invention is applicable to other salts of carboxylic acids, as well as other alkyl sulfates than those obtained by the interaction of ethylene and sulfuric acid:

4050 pounds of "dilute aqueous distillate" liquor from a previous run, the source of which is described more fully hereinafter, containing approximately 2% ethyl acetate, 3% alcohol and 1% acetic acid, the remainder being water; and 3080 pounds of water are charged into a vessel equipped with an agitator and heating coil. After the temperature has been adjusted to approximately 75°–80° C., 7130 pounds of crude diethyl sulfate, having an analysis approximating that indicated above, are added over a period of approximately one hour. The agitation and foregoing temperature range is maintained for three additional hours during which the hydrolysis of the diethyl sulfate is completed and a portion of the ethyl sulfuric acid is converted to ethyl alcohol and sulfuric acid. The reactions involved are as follows:

$$(C_2H_5)_2SO_4 + H_2O \rightarrow C_2H_5OH + C_2H_5HSO_4$$

$$C_2H_5HSO_4 + H_2O \rightleftarrows C_2H_5OH + H_2SO_4$$

The presence of the large excess of water favors the formation of sulfuric acid in the second equation, more than eighty per cent of the water required by the crude diethyl sulfate for complete hydrolysis being consumed in three hours.

1250 pounds of "dilute ester distillate", the origin of which will be described more fully hereinafter, containing approximately 40% ethyl acetate, 40% alcohol and 20% water, together with 5900 pounds of grey lime (80% calcium acetate) are added to the hydrolyzed mixture rapidly. Very little heating is required during the early stages of the reaction which results in the volatilization of approximately 154 pounds of crude diethyl ether. When the temperature at the top of the column reaches 60° C. the ether fraction is cut and the ester fraction is collected. The ester fraction amounts to approximately 5830 pounds which will be found to have an analysis as follows:

|  | Per cent |
|---|---|
| Ethyl acetate | 85 |
| Ethyl alcohol | 5.5 |
| Ether | 1 |
| Water | 8.5 |

3240 pounds of water are added gradually through the column during the ester distillation. Approximately 200 pounds of water separate from the ester fraction at the bottom of the tank containing the ester distillate which may be decanted and added to the "dilute aqueous distillate" liquor.

After the above quantity of ester has been collected the distillation is continued without the addition of water whereby one obtains the "dilute ester distillate" fraction which has already been referred to hereinabove. This fraction is collected until the temperature at the top of the column reaches 90° C.–93° C. Thereafter a new cut is made and the distillation is then continued until approximately 3848 pounds of "dilute aqueous distillate" liquor is collected which has likewise been referred to heretofore. The residual calcium sulfate and the dilute aqueous sulfuric acid mixture in the still is then discharged and the still washed and prepared for another run.

The final acetate recovery efficiency is better than 94% and the alcohol recovery efficiency is approximately 93%–94%.

Although the invention has been described as applied to the manufacture of ethyl acetate from a crude diethyl sulfate obtained by the interaction of ethylene and concentrated sulfuric acid, it is to be understood that it is not so limited and that the source of the diethyl sulfate is not limitative of its application to my invention. Furthermore, although the description provides for the preparation of the ethyl acetate ester, the invention is equally applicable to the propyl or butyl esters. Finally, it is to be noted that whereas heretofore it has been considered desirable to take advantage of the dehydrative action of strong sulfuric acid in the preparation of esters from salts of carboxylic acids according to which dilution was restricted or entirely avoided, I have found that the addition of water and preliminary hydrolysis of the sulfate ester is highly advantageous. To this end I provide for the addition of approximately an equal part by weight of water to the sulfate ester to effect hydrolysis and subsequently eliminate a part of the acid thus liberated by reacting the same with calcium acetate. Obviously, this amount of water may be varied; however, it should not be reduced by more than one-half since the yield of ester obtainable is thereby impaired.

What I claim is:

1. In the manufacture of alkyl esters of carboxylic acids from salts of carboxylic acids and alkyl sulfates obtained by combining gaseous olefines containing 2 to 4 carbon atoms with concentrated sulfuric acid under conditions whereby the dialkyl sulfates of said olefines are formed, the steps which comprise hydrolyzing the alkyl sulfate with water whereby all of said dialkyl sulfate is reacted to form products of hydrolysis, and subsequently adding an inorganic salt of a carboxylic acid in an amount and under conditions whereby there is at all times present either free sulfuric acid or alkyl hydrogen sulfate.

2. The method of manufacturing ethyl acetate from an inorganic salt of acetic acid and the reaction product of ethylene and sulfuric acid which contains a substantial quantity of diethyl sulfate, characterized in that the reaction product of ethylene and sulfuric acid is first hydrolyzed with water whereby all of the diethyl sulfate is decomposed into products of hydrolysis, and subsequently adding the salt of acetic acid in an amount and under conditions whereby there is present at all times free sulfuric acid or ethyl hydrogen sulfate.

3. The method as defined in claim 2 and further characterized in that the ethylene reaction product of sulfuric acid contains approximately 50%–55% diethyl sulfate, 30%–40% ethyl hydrogen sulfate, and some free sulfuric acid, and the amount of water added for the purpose of the hydrolysis is approximately an equal part by weight.

4. The method as defined in claim 2 and further characterized in that the amount of water added to effect hydrolysis is not substantially less than 50% by weight of the ethylene-sulfuric acid reaction product.

5. The method as defined in claim 2 and further characterized in that the quantity of water employed in the hydrolysis of the ester is approximately equivalent to the weight of the ethyl sulfate ester and the amount of carboxylic acid in the form of its salt is not substantially in excess of the mol equivalent of ethyl radical which is to be combined with the carboxylic acid.

6. The method as defined in claim 2 and further characterized in that the ethyl acetate is distilled from the mixture while adding water to the charge undergoing distillation.

7. The method as defined in claim 2 and further characterized in that the ethyl acetate is distilled from the mixture while adding water through the still column to the charge undergoing distillation.

WILLIAM S. WILSON.